United States Patent [19]
Bakker et al.

[11] Patent Number: 5,574,852
[45] Date of Patent: Nov. 12, 1996

[54] INTEGRATED MICROCONTROLLER HAVING A CUP-ONLY MODE OF OPERATION WHICH DIRECTLY OUTPUTS INTERNAL TIMING INFORMATION FOR AN EMULATOR

[75] Inventors: Jacobus M. Bakker, Eindhoven, Netherlands; Dieter Hagedorn, Hamburg, Germany

[73] Assignee: U.S. Philips Corporation, New York, N.Y.

[21] Appl. No.: 329,791

[22] Filed: Oct. 26, 1994

Related U.S. Application Data

[63] Continuation of Ser. No. 817,020, Jan. 3, 1992, abandoned.

[30] Foreign Application Priority Data

Jan. 17, 1991 [EP] European Pat. Off. .............. 91200079

[51] Int. Cl.$^6$ .................................................. G06F 9/455
[52] U.S. Cl. ...................... 395/183.04; 395/500
[58] Field of Search ................. 395/183.04, 500

[56] References Cited

U.S. PATENT DOCUMENTS

| | | | |
|---|---|---|---|
| 4,145,760 | 3/1979 | Ward et al. | 365/226 |
| 4,441,154 | 4/1984 | McDonough et al. | 395/800 |
| 4,677,548 | 6/1987 | Bradley | 395/800 |
| 4,677,586 | 6/1987 | Mager et al. | |
| 4,901,259 | 2/1990 | Watkins | 364/578 |
| 4,939,637 | 7/1990 | Pawloski | 395/800 |
| 5,053,949 | 10/1991 | Allison et al. | 395/375 |

OTHER PUBLICATIONS

Intel Microcontrollable Handbook, 1985, 9–29 through 9–39.

*Primary Examiner*—Krisna Lim
*Attorney, Agent, or Firm*—Edward Blocker; Laurie Gathman

[57] ABSTRACT

For use by an emulation circuit, a non-special-custom microcontroller multiplexes a port among user data and program store addresses. It has a multistate machine cycle with plural clock pulses per state. Various additionally provided emulation pins allow for outputting to an emulation circuit any or all of the following signals:

- a start-of-cycle pulse indicating non-sleep mode
- a state-wise recurrent signal signalling progress of said states during non-sleep mode
- a signal discriminating between idle and reset
- a multiplexed signalization among any or all of the following:
  that a next-following machine cycle is the first of a next instruction;
  that presently an interrupt is being processed;
  that an external program memory access is forthcoming;
  that an external data memory access occurs;
  that an external data memory write access occurs.

Since more accurate timing signals are thus provided to the emulation circuit by the microcontroller than can be derived by the emulation circuit otherwise, the emulation circuit can operate at higher speeds.

13 Claims, 4 Drawing Sheets

| A | | INTACK | PRGEXT | L | C1 | MOVEXT | WREXT | INTACK | |
|---|---|---|---|---|---|---|---|---|---|
| B | | INTACK | PRGEXT | L | C1 | PRGEXT | L | INTACK | |
| C | | IDL/RES | | | | | | | |

INTEGRATED MICROCONTROLLER HAVING A CUP-ONLY MODE OF OPERATION WHICH DIRECTLY OUTPUTS INTERNAL TIMING INFORMATION FOR AN EMULATOR

This is a continuation of application Ser. No. 07/817,020, filed Jan. 3, 1992, now abandoned.

BACKGROUND TO THE INVENTION

The invention relates to an emulation device for emulating a non-special-custom version of a microcontroller that has a standard port. The device includes an in-microcontroller multiplexing device for multiplexing the port among user data and program store addresses and externally to the microcontroller, and a register connected to the port for latching the program store addresses. The microcontroller has a machine cycle that includes a plurality of states which each comprise at least two clock pulses.

The transferring in multiplex version, of both program store addresses and user data, along a single port diminishes the requirement for having many ports. U.S. Pat. No. 4,809,167 to Metalink Corporation discloses an extension of the general principle, in that a particular 8-bit wide port transfers successively an opcode, a program counter byte, and a user data item. Such an emulation device has been described in the reference with respect to an Intel 8051 single chip microcomputer or microcontroller. The use of a non-special-custom emulating microcontroller naturally obviates the need for developing a special-custom version for emulation and test use only. In earlier standard organization, the 8051 shares port PØ among program opcode and program counter low byte address, whereas port P2 outputs program counter high byte address. The recurrency of outputting a program address is twice per machine cycle. The referenced Metalink "hooks" improvement provides for, within each half of the machine cycle, separate multiplexing program opcode, program counter address data, and port data, which was not possible with the original timing.

The inventors of the present invention have experienced that emulation according to the reference was insufficiently accurate and/or insufficiently reliable, in particular, because nearly all external timing was to be reconstructed externally to the microcontroller from either one of the address latch enable signal and/or program store enable signal, and in certain derivative microcontrollers that had no provision for outputting any of these enabling signals, even from the external crystal clock. Such reconstruction always suffers from non-conforming gate delays that may be subject to temperature-caused time skew and other deformity. Another cause of distress is that externally to the microcontroller, no discrimination was visible between two nonoperating modes, i.e. between idle and reset. The referenced 8051 microcontroller, in addition, has also a power down mode, in which processing capability is brought down for reasons of energy conservation.

SUMMARY TO THE INVENTION

According to one of the objects of the present invention the microcontroller signals various internal, static or recurrent situations effectively to an output for allowing more accurate synchronization between the microcontroller and external emulation circuitry. Inter alia, such improvement allows a higher maximum clock frequency for present or future realization. According to one of its objects, the invention provides a microcontroller having a first pin for under internal oscillator control outputting in non-sleep mode of the microcontroller a first-valued signal pulse (S1ES) straddling each start instant of any of the machine cycles, and a second pin means for under internal oscillator control outputting a recurrent active signal (PHIS) in each of the plurality of states while being inactive during sleep mode. Of course, the microcontroller is synchronized by an internal device, such as an electronic oscillator, or by an external device, such as a crystal. In both cases, the synchronization is embodied in an internally available clock pulse series, which herein for brevity is referred to as an "internal oscillator". Now, the direct external signalization of the internal states of the microcontroller's clock cycle allows for tighter coupling to external emulation circuitry, that would better discriminate between correct operation and malfunctioning.

Advantageously, the active high signal pulse has a duration substantially equal to one of the states, wherein the recurrent signal has a period of substantially one of the states, and wherein inactive is power down high. This provides for easy external organization. Moreover, deriving these external signals from internal clock pulse edges, is straightforward, such as by use of edge-triggered flipflops and only a few gates. Generally, in idle mode the internal clock signals have their standard recurrency pattern.

Another object of the invention is to provide a microcontroller including a third pin for outputting multiplexed emulation control signals, in discrimination of an active mode versus any of a power down mode, an idle mode, and a reset mode, where during at least one state interval of the machine cycle (S4E), a first indicator signal (C1) selectively indicates whether a next-following machine cycle is a first machine cycle of a next machine instruction. Whereas the earlier solution allowed for clear-cut synchronization within a single machine cycle, the latter provision allows for synchronization on an inter-machine cycle pipelining level. This allows the external evaluation mechanism to know what operation the microcontroller is presently operating in, and what kind of operation is to be expected next. Various execution parts of the instruction are fetching, interpreting, accessing memory, evaluating an outcome and determining whether a conditional operation must or must not be effected. Also in this case, the improved synchronization allows for better timing relationships, and, as the case may be, for a higher attainable clock frequency.

Given such a third pin various other indicator signals allow for using the latter pin as signalling any or all of present execution of an interrupt request, a forthcoming external programming memory access, during a "move external instruction" an external data memory access, or an external data memory write access. All of these signals may, if necessary be multiplexed over a single pin.

According to a still further related object solution, the invention provides an emulation device as recited supra, wherein the microcontroller includes a fourth pin for outputting a static binary signal whereof a first state indicates whether the microcontroller is in any of idle, powerdown, or reset states, as being distinct from a second state on the fourth pin. Such signalization boils down to a synchronization mechanism on a longer time scale which may extend to infinity.

The invention also relates to a non-special-custom microcontroller for use in an emulation device as recited supra, and comprising selected ones or all of the recited advantageous features. Additional advantages as realized by such features are recited in further dependent claims.

BRIEF DESCRIPTION OF THE DRAWING

The invention will be explained in relation with the appended Figures, which successively show a preferred embodiment, as follows.

DESCRIPTION OF PRIOR ART EMBODIMENTS

Figure 1:
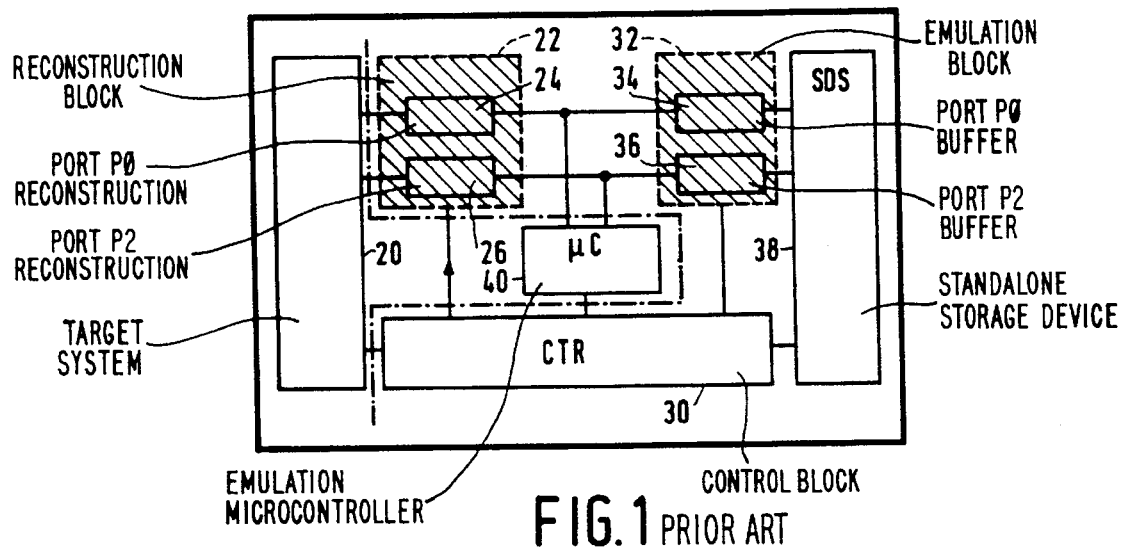
FIG. 1 shows a generalized diagram of a so-called microcontroller probe.

FIG. 1 is a generalized diagram of a so-called microcontroller probe. Block 20 represents the target system that is the object of the emulation process, and which has been designed to accommodate a standard copy of the microcontroller in question provided with an application or user program and which system furthermore includes such hardware to fulfill the intended user function in cooperation with and/or under control from the application program. The emulation checks for the correct functioning of the above program in cooperation with the hardware. By way of example, the target system may be a telephone handset provided with certain intelligent user functionality. Inasmuch as the present invention is not directed to improvement of the target system itself, no further explanation is given for reasons of brevity.

Next, blocks 22, 30, 32 are sub-systems of what is conventionally called an "emulator probe" and which interfaces the various partner devices in the emulation process. First, block 22 is the reconstruct block which provides access to those internal connections of the target system that its microcontroller should use. During emulation the specifically adapted 8051 microcontroller (or its derivative or an otherwise suitable controller) is in position as given by block 40, to execute the application program in lieu of the corresponding microcontroller that during normal use should form part of the target system but is absent therefrom during emulation. The positioning of microcontroller 40 is by a standard type microcontroller socket, cf. FIG. 5. Block 22 reconstructs ports PØ, P2 in subblocks 24, 26, respectively. The reconstruction is so, that the operation of microcontroller 40 remains undisturbed, with respect to signal transfer in either direction.

In a similar manner, emulation block 32 interfaces to standard SDS block 38 a stand alone device of conventional build, such as Philips PM4726/10, PM4726/30 or OM4120 block 32 has buffered outputs to block 38 for each of ports PØ, P2, as indicated (34, 36, respectively). For reasons of brevity, block 38 is not detailed further. Emulation block 32 selects the information that SDS device 38 needs for addressing the emulation memory and for tracing the emulation microcontroller 40. It sends the instructions of the emulated program to microcontroller 40 and inserts the emulation break routines. On a level higher than the machine cycle of microcontroller 40, emulation is a standard art which is not being detailed further for reasons of brevity.

Control block 30 interfaces to: reconstruct block 22; emulation block 32; emulation microcontroller 40; target system 20; and SDS block 38. It handles the adjustments needed in the control signals, and also handles the enable signals for various blocks. Moreover, after a reset operation it sets microcontroller 40 in microprocessor mode. In the above, the interconnection shown is not on a wire by wire basis, but only symbolically. Moreover, the set up of the above is on a block level approximately identical to the emulation system of the citation.

Figure 2:
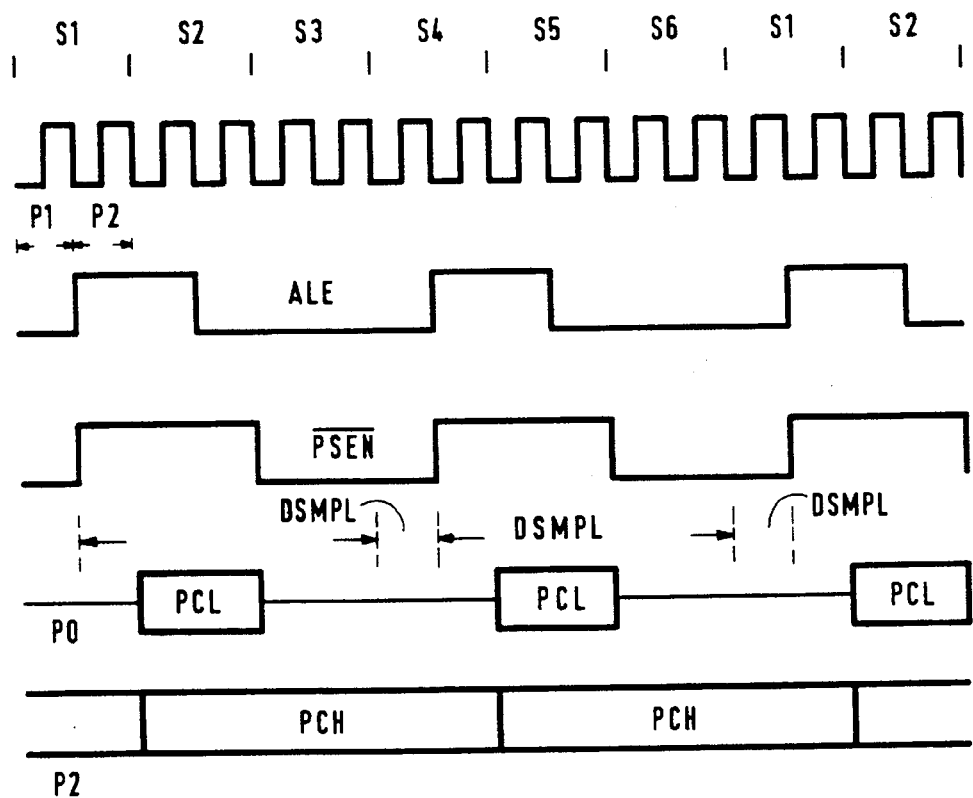
FIG. 2 shows timing diagrams related to a standard 8051 microcontroller.

FIG. 2 is a timing diagram related to a standard 8051 microcontroller. The top trace shows the six states S1 ... S6 of each machine cycle, each state with its first and second clock pulses. The clock is synchronized on a machine cycle level by an external crystal or by an internal electronic oscillator, and various internal and external control signals are derived therefrom. However, this synchronzation is not very accurate due to internal gate delays. The next trace shows the address latch enable (ALE) signal that has a recurrency of twice per machine cycle, and if high, signals availability of an external address. The next trace shows program store enable signal (PSEN), which if low enables reading from an external program store which is in addition to a non-special-custom, internal program store of the microcontroller. The next trace shows the usage of port PØ), which outputs a program address counter low byte (PCL), and, in the same half machine cycle allows for sampling an instruction information item that is presented from outside (DSMPL). In any half cycle both information transfer directions may occur. The last trace shows the usage of port P2 which in each half machine cycle allows for outputting a program address counter high byte. In this way, a sixteen bit address is available externally. Port P527 has a multiplex function among PCL out and data in. For the remainder, ports PØ, P2 are lost.

Figure 3:
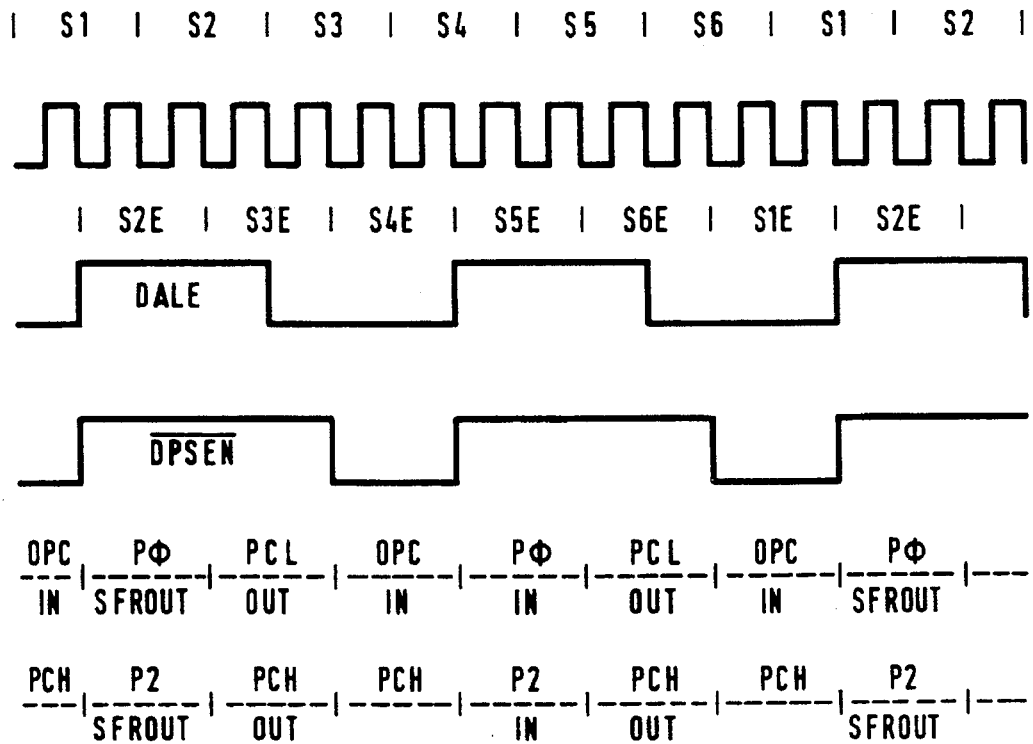
FIG. 3 shows timing diagrams related to the so-called Metalink "hooks" specified in the cited reference.

FIG. 3 has timing diagrams related to the so-called Metalink "hooks" specified otherwise in the cited reference. These represent a favorable extension of FIG. 2. First, the machine cycle, states and clock pulses are unchanged with respect to FIG. 2. The trace shows the delayed address latch enable signal DALE that has its rear edge delayed by one half state, so its activity interval (high) covers both the standard state S2 and S2E, which corresponds to state S2 but is advanced one half state length. In the same way, program store enable signal DPSEN has its rear edge delayed by one half state interval to cover all of the advanced states S2E, S3E. Under combined control of signals DALE and DPSEN, ports PØ, P2 are now multiplexed among a whole set of signals, as shown: PØhas in state S1E, opcode in (from the emulation control); in state S2E outputting of an 8-bit special function register SFR, which is the internal PØ) latch; in state S3E, PCL (Program Counter Low byte) is outputted, which is advanced by one half state length with respect to FIG. 2. State S4E corresponds to state S1E (E for Early), and allows for feeding the instruction opcode into the microcontroller. State S5E allows for inputting of information into the microcontroller of information present in an externally reconstructed/latched register to the PØ) port pins. State S6E corresponds to state S3E. In consequence, the bidirectional transfer of data in state S2E/S5E is an extra to FIG. 2 which sees that port PØ remains accessible.

As to port P2, also a multiplex function is realized. First states S3E/S6E have PCH out in synchronism with port PØ. Second, states S2E/S5E correspond to the functionality with respect to port PØ, that this outputting of the special function register SFR in state S2E and inputting from the externally reconstructed register in state S5E. Third, states S1E/S4E have availability of PCH. This longer availability feature obviates the need for externally latching of this byte. Generally, the sixteen bit address allows for a 16k address space.

DESCRIPTION OF A PREFERRED EMBODIMENT ACCORDING TO THE PRESENT INVENTION

Figure 4:
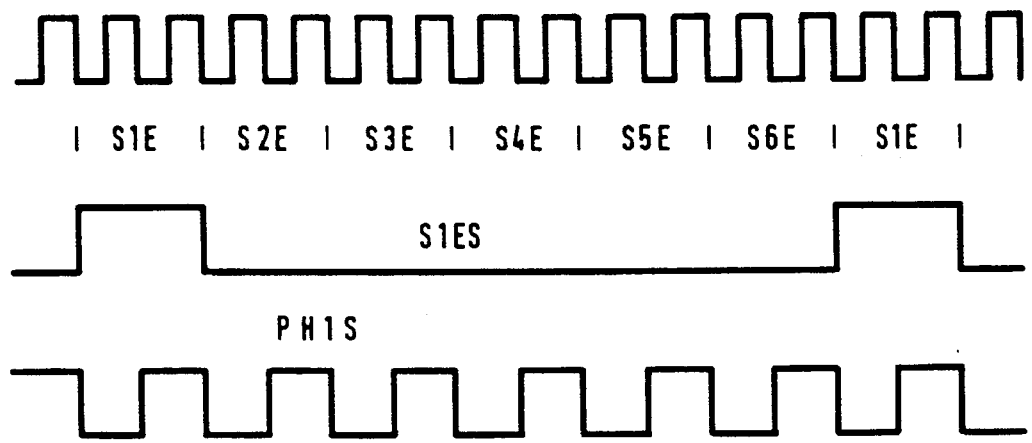
FIG. 4 shows timing diagrams relating to the present invention.
Figures 5, 6:
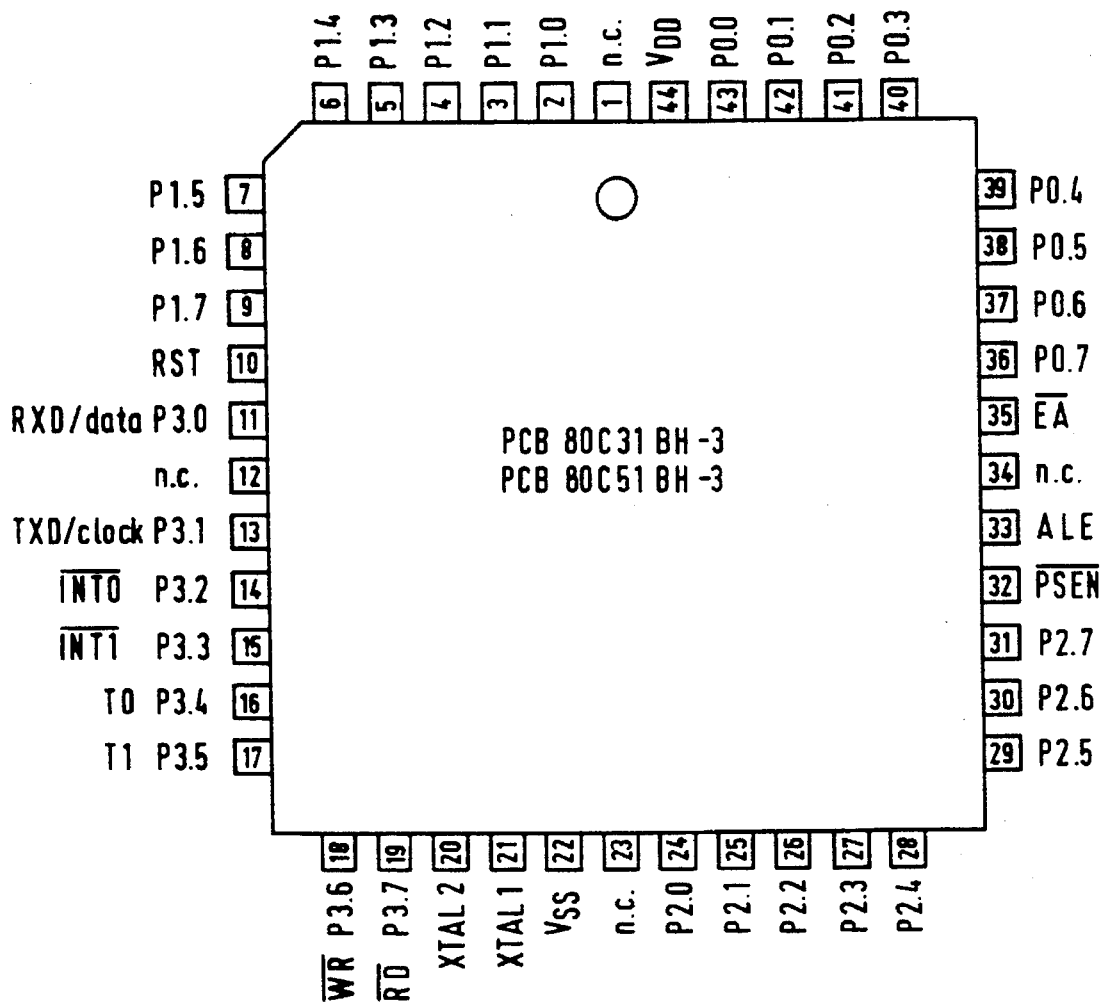
FIG. 5 shows a pinning diagram of a non-special-custom microcontroller according to the invention.
FIG. 6, shows a sequence of signals according to the invention.
Figure 7:
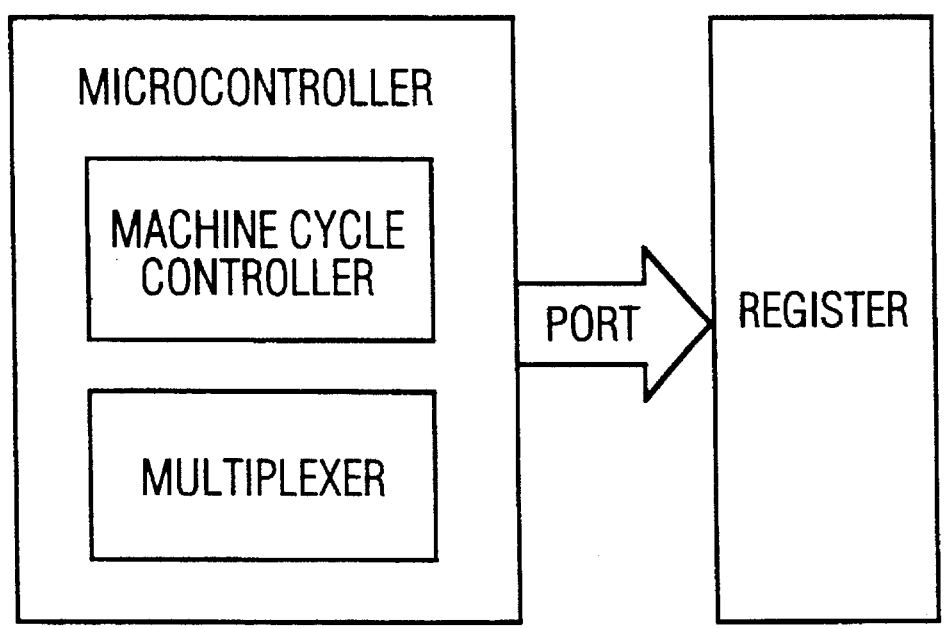
FIG. 7 shows a block diagram of the instant invention.

FIG. 4 gives a timing diagram of a machine cycle according to the present invention and FIG. 5 is a pinning diagram of a non-special-custom microcontroller according to the present invention. Regarding to the latter, in a 4×11 square configuration, the following standard pins occur: eight bit port P0 (PØ.0..PØ.7); eight bit port P1 (P1.0..P1.7); eight bit port P2 (P2.0..P2.7); eight bit port P3(P3.0..P3.7); VDD; RST (reset); XTAL1; XTAL2 for attaching to an external crystal; VSS; PSEN; ALE; EA. Furthermore the various pins of port P3 all double for communicating respective control signals, that is RXD/Data, TXD/Clock, INT0, INT1, T0, T1, WR, RD. For further information on these standard pins, reference is had to the commercial documentation. A similar packaging is as 40-pin DIL, but the latter does not have the four unused pins n.c., that are utilized according to the invention. Extension to a 44-pin DIL is quite feasible however. In particular, the following emulation control signals are suitable for use with the Metalink hooks according to the reference, so the earlier extensions to the standard 8051 architecture remain in use. Alternatively, all or part of the provisions, infra, would be usefull in combination with various other emulatable microcontroller architectures. Now, the particular emulation control or signalization provisions are as follows:

1. S1ES, this pin is active low during machines states S2E through S6E, and high during machine state S1E that straddles the beginning of a standard machine cycle at the start of machine state S1, as long as the internal oscillator of the microcontroller is running as being either self-synchronized or synchronized by an external crystal, otherwise this pin is high continuously. The active interval is during machine cycle states S2E through S6E, for so signalling the sleep mode. Changeover between sleep mode, i.e. power down, and non-sleep mode can occur at instants that are spaced from each other by twelve oscillator periods, or clock pulses, notably at the end of state S1E. The relatively brief interval of S1ES being high allows for good synchronization. During power down mode nothing happens so synchronization would not be crucial then.

2. PH1S, this pin signals the sleep mode. As shown, it is active low during all P2 clock pulse periods of all machine states, as long as the oscillator is running. It is continuously high when the oscillator is not running, and high anyway, during all P1 clock pulse periods of any machine state. Note that only in power down or sleep mode the internal oscillator is stopped. Otherwise, the oscillator keeps running at standard speed.

3. IDLPD is a static signal that is active high when the microcontroller is in either one of idle, powerdown, or reset modes. In each of these three modes the standard processing capability is not maintained, either because certain subsystems of the microcontroller are blocked from receiving cyclic activation by the internal clock pulses, for example during those intervals in which these subsystems should consume only minimal power, or are kept stationary by a specific signal, such as the reset. By itself, these three operating modes are standard. The signal IDLPD may be produced by a conventional OR of the control signals which internally to the microcontroller controls these various modes.

4. EMUMPX, this is a multiplexed emulation output used by the emulation logic for detecting various internal occurrences or events, that are as follows. Inasmuch as these occurrences are generally only relevant in particular machine states, they can be multiplexed according to diagram of FIG. 6, wherein the following applies.

Generally, there are three principal situations. In the first of these, IDLPD is low, signalling that the microcontroller is not in either of the modes wherein the processing is -temporarily- held back. Now, in these situations, the sequence A may occur during the first machine cycle of the execution of a move external instruction. Herein, early machine states S1E . . . S6E have the following signals.

During state S1E, signal INTACK indicates that an interrupt request is being processed. This means, that the next machine cycle will be first machine cycle of a forced LCALL (long call) instruction, from the standard instruction set, which lone call allows for accessing a 0 . . . 64 kbyte address range. If no interrupt request is presently being processed, during S1E this signal is not active. The shape of an active signal versus a passive signal is generally a pulse having a length of the complete machine cycle, that is two clock pulses. However, if convenient, another signal pattern may be adopted.

During state S2E, signal PREGEXT indicates whether an upcoming external (target) program memory access will occur. The internal program memory has 16-bit addresses. This internal memory may be supplemented by an external program memory up to the same address range.

During state S3E, this emulation output is continuously low.

During state S4E, signal C1 indicates that the present machine cycle is the last cycle of an instruction so that the next cycle by necessity will be the first cycle of a next machine instruction.

During state S5E, signal MOVEXT indicates that a move external instruction is executed with an address greater than 255, which address would consequently not fit within a single address byte. Also this signalization would be useful to external emulation.

During state S6E, signal WREXT indicates the occurrence of a MOVEXT instruction which causes a write access to the external data memory and having data pointer value greater than 255. With respect to these two signalizations during S5E, S6E the same register (DTPR register) would apply, whereas during both machine cycle states, an active signal could be present. So, as it were, the first 256 locations of external data memory are mapped inside.

In the described sequence A, either of cases MOVEXT, WREXT may occur as explained supra. Sequence B, which differs slightly from sequence A is followed if neither of cases MOVEXT, WREXT occurs. The differences occur during only states S5E/S6E.

During state S5E, the same signal may occur as during earlier state S2E, which allows frequent program memory access. During state S6E, the emulation signalization is low.

Due to (standard) internal propagation delays, the signals INTACK, PRGEXT and MOVEXT are internally to the microcontroller available only a certain time after the start of their respective clock pulses PH2, which is the second clock pulse of the standard machine states and, in consequence, the first clock pulse of the "early" machine states used throughout in the above. In consequence, at the beginning of the corresponding early machine states there may exist invalid data on the multiplexer pin EMUMPX. However, at least during the next-following clock pulse PH1, the information will be valid.

In FIG. 6, sequences A, B relate to active mode. In addition to earlier features, signal C indicates the signalization of a fourth emulation control pin. The latter pin is used for outputting a signal discriminating between idle mode and reset mode. Note that existence of power down mode is already signalled otherwise as disclosed earlier. The signalization, according to sequence C may be a continuous high signal, for idle, and continuous low, for reset, or reversely. Other signal shapes could be applicable as well.

Now, the four emulation control pins, so described, in the set-up of FIG. 1, go to evaluation device 38, which as based on the respective situation, signals necessary indication to a human user in visual display or hardcopy. Further logging and other operations may apply. As such signal treatment in the art of emulation is generally known, no detailed disclosure is given for reasons of brevity.

We claim:

1. An improved microcontroller for use in an emulation circuit that externally controls execution of instructions by said microcontroller, said microcontroller having a CPU and internal memory and providing no direct external access to internal buses connecting said CPU and internal memory and wherein said microcontroller has at least two externally controlled alternative circuit configurations, one of said alternative circuit configurations including said internal memory and another one of said alternative circuit configurations not including said internal memory, said microcontroller also having a sleep mode of operation and at least one non-sleep mode of operation, said microcontroller further operating in accordance with a series of machine cycles each comprising a plurality of machine states, said improved microcontroller comprising:

means for outputting on a dedicated first pin of said microcontroller, whenever said microcontroller is not in said sleep mode, a first pulse occurring once each machine cycle and synchronized with a predetermined single one of said machine states of each said machine cycle for use by said emulation circuit to synchronize said emulation circuit with each of said machine cycles of said microcontroller; and means for outputting on a dedicated second pin of said microcontroller, whenever said microcontroller is not in said sleep mode, a second pulse occurring once each machine state and synchronized with each of said machine states of each said machine cycle for use by said emulation circuit to synchronize said emulation circuit with each of said machine states of said microcontroller.

2. An improved microcontroller as defined in claim 1 wherein each said first pulse begins during a last one of said machine states of one of said machine cycles and ends during a first one of said machine states of a next successive one of said machine cycles.

3. An improved microcontroller as defined in claim 1 wherein the second pulse has a pulse cycle that is equal in length to one of said machine states of said machine cycle and said second pin is inactive during said sleep mode.

4. An improved microcontroller as defined in claim 2 wherein each of said first pulses is equal in width to one machine state of said machine cycle and begins at the middle of said last one of said machine states of said one of said machine cycles.

5. An improved microcontroller as defined in claim 1 wherein said dedicated first pin is held at high value continuously during said sleep mode.

6. An improved microcontroller as defined in claim 1 wherein said dedicated second pin is held at high value continuously during said sleep mode.

7. An improved microcontroller for use in an emulation circuit that externally controls execution of instructions by said microcontroller, said microcontroller having a CPU and internal memory and providing no direct external access to internal buses connecting said CPU and internal memory and wherein said microcontroller has at least two externally controlled alternative circuit configurations, one of said alternative circuit configurations including said internal memory and another one of said alternative circuit configurations not including said internal memory, said microcontroller also having an active mode of operation and at least one inactive mode of operation, said microcontroller further operating in accordance with a series of machine cycles each comprising a plurality of machine states, said improved microcontroller comprising:

means for outputting on a pin of said microcontroller, whenever said microcontroller is in said active mode of operation, a multiplexed emulation control signal for use by said emulation circuit to synchronize said emulation circuit with said microcontroller on an inter-machine cycle pipelining level, said multiplexed emulation control signal including a first indicator signal synchronized with a predetermined machine state of each said machine cycle for selectively indicating whether a next-following machine cycle is a first machine cycle of a next machine instruction to be executed by said microcontroller, and said multiplexed emulation control signal also including at least one second indicator signal, each of said at least one second indicator signal being synchronized with a predetermined different machine state of each said machine cycle for identifying a type of operation that the microcontroller is currently processing or will next process.

8. An improved microcontroller as defined in claim 7 wherein said at least one inactive mode of operation of said microcontroller includes a reset mode and an idle mode and said microcontroller further includes means for outputting a first signal level on said pin to said emulation circuit whenever said microcontroller is in said reset mode and for outputting a second signal level different from said first signal level on said pin to said emulation circuit whenever said microcontroller is in said idle mode, whereby said emulation circuit can discriminate between said reset mode and said idle mode of said microcontroller.

9. An improved microcontroller as defined in claim 7 wherein one of said at least one second indicator signal is synchronized with a first one of said machine states of each said machine cycle and selectively indicates to said emulation circuit whether currently an interrupt request is being processed by said microcontroller.

10. An improved microcontroller as defined in claim 7 wherein one of said at least one second indicator signal is synchronized with a second one of said machine states of each said machine cycle and selectively indicates a forthcoming external program memory access.

11. An improved microcontroller as defined in claim 7 wherein one of said at least one second indicator signal is synchronized with one of said machine states in a second half of each said machine cycle and selectively indicates a forthcoming external data memory access.

12. An improved microcontroller as defined in claim 7 wherein one of said at least one second indicator signal is synchronized with one of said machine states in a second half of each said machine cycle and selectively indicates an external data memory write access.

13. An improved microcontroller for use in an emulation circuit that externally controls execution of instructions by said microcontroller, said microcontroller having a CPU and internal memory and providing no direct external access to internal buses connecting said CPU and internal memory and wherein said microcontroller has at least two externally controlled alternative circuit configurations, one of said alternative circuit configurations including said internal memory and another one of said alternative circuit configurations not including said internal memory, said microcontroller also having an active mode of operation, a reset mode of operation and an idle mode of operation, said improved microcontroller comprising:

means for outputting a static binary signal on a pin of said microcontroller to said emulation circuit indicating whether the microcontroller is in said active mode; and means for outputting a static first signal level on another pin to said emulation circuit whenever said microcontroller is in said reset mode and for outputting a static second signal level different from said static first signal level on said another pin to said emulation circuit whenever said microcontroller is in said idle mode, whereby said emulation circuit can discriminate among the active mode, the reset mode and the idle mode of said microcontroller.

* * * * *